United States Patent [19]

Burow et al.

[11] Patent Number: 4,753,680
[45] Date of Patent: Jun. 28, 1988

[54] PROCESS FOR THE PREPARATION OF BRIGHT, COLOR-PURE IRON OXIDE RED PIGMENTS

[75] Inventors: Wilfried Burow; Jürgen Wiese; Gunter Buxbaum, all of Krefeld, Fed. Rep. of Germany

[73] Assignee: Bayer Aktiengesellschaft, Leverkusen, Fed. Rep. of Germany

[21] Appl. No.: 813,377

[22] Filed: Dec. 26, 1985

[30] Foreign Application Priority Data

Jan. 9, 1985 [DE] Fed. Rep. of Germany ....... 3500470

[51] Int. Cl.⁴ ............................................... C09C 1/24
[52] U.S. Cl. .................... 106/304; 106/309
[58] Field of Search ............................ 106/304, 309

[56] References Cited

U.S. PATENT DOCUMENTS

| 4,090,888 | 5/1978 | Rademachers et al. | 106/304 |
| 4,234,348 | 11/1980 | Brunn et al. | 106/304 |
| 4,256,508 | 3/1981 | Patil et al. | 106/304 |
| 4,297,395 | 10/1981 | Buxbaum et al. | 427/127 |

Primary Examiner—Paul Lieberman
Assistant Examiner—Willie J. Thompson
Attorney, Agent, or Firm—Connolly & Hutz

[57] ABSTRACT

A bright, color-pure iron oxide red pigment is produced by an improved process by precipitation of iron(II) salts in aqueous solution with an alkaline precipitating agent, oxidation at temperatures of from 20° C. to 100° C. and annealing of the resulting precipitation products under air to form iron oxide red pigments, wherein the improvement comprises before adding the alkaline precipitating agent, the iron(III) content of the aqueous solution is adjusted to 1 to 15 mol %, based on the total iron content of the iron salt solution.

11 Claims, 2 Drawing Sheets

PROCESS FOR THE PREPARATION OF BRIGHT, COLOR-PURE IRON OXIDE RED PIGMENTS

BACKGROUND OF THE INVENTION

This invention relates to a process for the preparation of bright, color-pure iron oxide red pigments by the precipitation of iron(II) salts with alkali in aqueous solution, oxidation at temperatures of from 20° C. to 100° C., followed by annealing of the resulting precipitation products in air to iron oxide red pigments, and the use of these iron oxide red pigments.

There are basically four known processes for the preparation of synthetic iron oxide red. One is the oxidation of iron oxide black $Fe_3O_4$ (T. C. Patton, Pigment Handbook, Volume 1, John Wiley and Sons, 1973).

Iron oxide red pigments are used in building materials and lacquers. Bright, color-pure iron oxide red pigments are desirable in particular for use in lacquer systems. The color shade of the pigment in the lacquer is determined according to DIN 6174 (equivalent ISO/-DIN 7724, 1-3 drafts). The red content, (a*)AS determined in the lacquer is taken as a measure of the color purity of the iron oxide red pigment.

The color shade of the iron oxide red pigment obtained after annealing is influenced by the choice of starting material, namely needle-shaped goethite or isometric magnetite. The use of needle-shaped goethite results in red pigments which have an undesirable yellow tinge. Finely divided isometric magnetites give rise to an iron oxide red with a purer color on annealing. Finely divided magnetites, however, can only be obtained by the aniline process, using aromatic nitro compounds as oxidizing agents.

Commercial iron(II) salts of the kind obtained as waste liquors in steel pickling works and titanium dioxide factories are normally used as the raw material for obtaining precipitated magnetite as the starting material for iron oxide red pigments. These waste liquors normally contain a small, variable proportion of iron(III). Precipitation is carried out, for example, with NaOH, $Na_2CO_3$, MgO, $MgCO_3$ or $NH_3$. The oxidizing agent used for precipitating the magnetite may be oxygen, air, chlorates, nitrates, peroxides, etc.

Three processes are known for the precipitation of isometric magnetites, the one-stage process, the two-stage process and the iron(III) chloride process.

In the one-stage process (Winnacker-Küchler, Volume 2, page 171, Munich 1970), iron oxide black is prepared in one step from iron(II) salts and alkalies with gassing at temperatures above 50° C. and pH values above 4.5. The iron(II) salt used in the process should be as far as possible free from iron(III) constituents (DE-PS No. 2,919,854, page 8, lines 19 et seq.).

In the first step of the two-stage process (Winnacker-Küchler, Volume 2, page 171, Munich 1970), a yellow nucleus is precipitated at an acid (pH ph <5) or an alkaline pH above 12 with alkalies at temperatures from room temperature to 100° C. under oxidizing conditions. This time-consuming step is followed by the second stage of the process, consisting of reacting the yellow nucleus with a further quantity of iron(II) salt and alkalies to form iron oxide black.

The iron(III) chloride process for the precipitation of iron oxide black is technically particularly complicated. It starts with mixtures of iron(III) salt and iron(II) salt used in approximately stoichiometric proportions corresponding to that of the magnetite, i.e. about ⅓ to ⅔ of the mixture is of the expensive iron(III) salt. The iron(III) used in this process is preferably iron(III) chloride (JP No. 56-60 789), which is highly corrosive. This salt is precipitated with alkalies to form brownish-black iron oxides.

The precipitation processes mentioned above yield magnetites which, on annealing, give rise to iron oxide red in the form of medium-fine to coarse iron oxide red pigments. These processes have the disadvantage that they do not yield the coloristically valuable iron oxide red pigments in the bright, color-pure range.

In order to obtain bright, color-pure iron oxide red pigments by the annealing of precipitated magnetite, it is necessary to use a precipitating magnetite which has a crystallite size of about 30 to 50 nm determined by X-ray and a specific surface area $S_{BET}$ of from 25 to 60 $m^2/g$. Magnetites having a particle size or crystallite size in this range cannot be obtained by the three precipitation processes mentioned above.

Various procedures are known for enabling products in the required range of crystallite sizes and BET surface areas to be obtained from the precipitation of iron oxide black. These procedures include reduction in the reaction temperature and lowering of the pH during precipitation, but these only give rise to a non-uniform precipitation product of isometric magnetite and needle-shaped components such as $\alpha$-FeOOH and $\gamma$-FeOOH. When these precipitated iron oxides are annealed, they give rise to $\alpha$-$Fe_2O_3$ of non-uniform particles and with a disturbing yellow tinge.

BRIEF DESCRIPTION OF THE INVENTION

It is an object of the present invention to provide a cost effective, technically elegant process for the preparation of isometric iron oxide red pigments which does not have the disadvantages of the processes described above.

Such a process has now surprisingly been found, in which magnetites obtained by precipitation in the presence of iron(III) ions give rise to bright, color-pure iron oxide red pigments when annealed. The particle size of these products can be controlled by means of the iron(III) content.

DETAILED DESCRIPTION

In contrast to the iron(III) chloride process described above, the process according to the invention does not require the use of expensive, corrosive iron(III) chloride.

The present invention thus provides a process for the preparation of bright, color-pure iron oxide red pigments by the precipitation of iron(II) salts with alkali in aqueous solution and oxidation at temperatures of from 20° to 100° C. and annealing of the resulting precipitation products in air to form iron oxide red pigments, wherein said solution is adjusted to an Fe(III) content of from 1 to 15 mol %, based on the total iron content of the solution, before addition of the alkaline precipitating agent. The oxidizing agent used in this process is preferably air.

At the beginning of the process, the iron(III) content required for controlling the particle size of the magnetite is produced in an iron(II) salt solution in which the iron(II) salts are preferably sulphates and/or chlorides obtained from steel pickling works and/or titanium dioxide production. Adjustment of the iron(III) content is preferably carried out by oxidative gassing of the acid iron(II) salt solution, e.g. an iron(II) sulphate solution at a pH of below 3. The iron(III) content increases with increasing gassing time. The iron(III) content is preferably produced by oxidation with air at a pH of below 3. This preliminary gassing is advantageously carried out with the aid of a gassing stirrer in a stirrer vessel at temperatures of about 20° to 100° C., although other reactors suitable for gas/liquid reactions, such as bubble columns, loop reactors, radiators, etc. could equally well be used.

A clear, pigment-free solution having the desired iron(III) content is obtained within a short time. This solution is surprisingly found to be free from unwanted, precipitated basic iron(III) sulphates. It has not been clarified in what form the trivalent iron is present in the solution. The iron(III) content required for preparing the magnetites varies within the range of from 1 to 15 mol % of iron(III), based on the total iron content.

The preliminary gassing is followed by precipitation and oxidation to magnetite. The precipitating agents used are preferably NaOH, $NH_3$, $Na_2CO_3$, MgO and/or $MgCO_3$. Exceptionally high yields are obtained when precipitation is carried out with 0.5 to 1.3 equivalents, preferably 0.8 to 1.3 equivalents, of the alkaline precipitating agent and the oxidizing agent used is preferably air. The reaction temperature is in the range of from 20° to 100° C., preferably above 70° C. The precipitation products are washed free from salt, dried and then annealed at 700° C. to 1100° C., preferably at 800° C. to 950° C., so that bright, color-pure iron oxide red pigments are obtained after grinding.

The iron oxide red pigments obtained after annealing of the magnetites are bright and with pure color, with particle sizes below 0.2 μm and the color shade in the lacquer has a red content (a*) above 26 CIELAB units. Such iron oxide red pigments with high color purity (a*>26 CIELAB units) are not obtainable by annealing magnetites prepared by the conventional method of precipitation. The color shade of the iron oxide pigment is determined according to DIN 6174 (equivalent ISO/-DIN 7724, 1–3 drafts), CIELAB c/2 deg. at a 10% pigment volume concentration (PVK) in the lacquer. The lacquer system used is Alkydal F 48 (trade product of Bayer AG).

It has further been found that the coloristic values of the end product can be advantageously influenced by the addition of soluble aluminium and phosphorous salts to the iron salt solution before precipitation. The addition of these compounds is advantageously carried out by adding a soluble aluminium salt in quantities of from 1 to 10 mol % and/or a soluble phosphorous salt in quantities of from 1 to 5 mol %, in each case based on the total iron content, to the solution before precipitation.

It is found that the brightness (L*) of the red pigments can be increased in dependence upon the Al or P content. The brightness values L* are obtained according to DIN 6174 (equivalent ISO/DIN 7724, 1–3 drafts), in the color shade determination of the pigment in the lacquer.

The present invention also relates to the use of the iron oxide red pigments prepared according to the invention for dyeing and coloring in the field of lacquers, ceramics, building materials and plastics.

The following Examples describe the production of the iron(III) content in the iron(II) salt solution, the precipitation of magnetite and the annealing to iron oxide red pigments having a red content a*>26 CIELAB units.

The Examples are given to illustrate the process and do not constitute any limitation.

EXAMPLE 1

Figure 1:
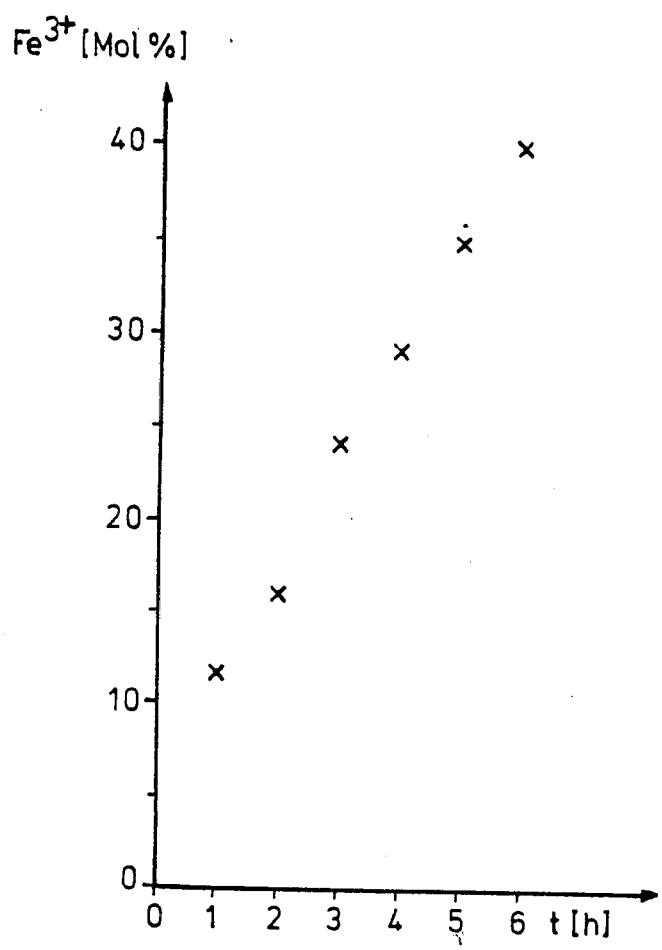
FIG. 1 shows the variation with time of the iron(III) content under conditions of oxidation with air according to Example 1.
Figure 2:
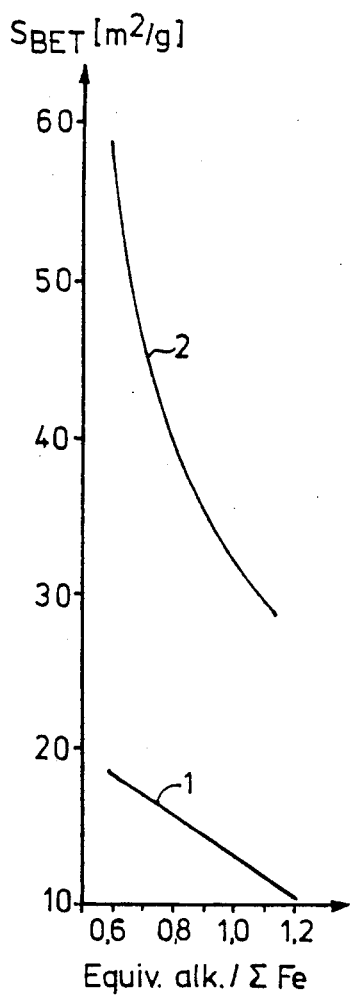
FIG. 2 shows the influence of the equivalent ratio of precipitating agent to total iron content without (Curve 1) and with 8.3 mol % of iron(III) (Curve 2) on the particle size of the magnetite, expressed by the specific surface area.
Figure 3:
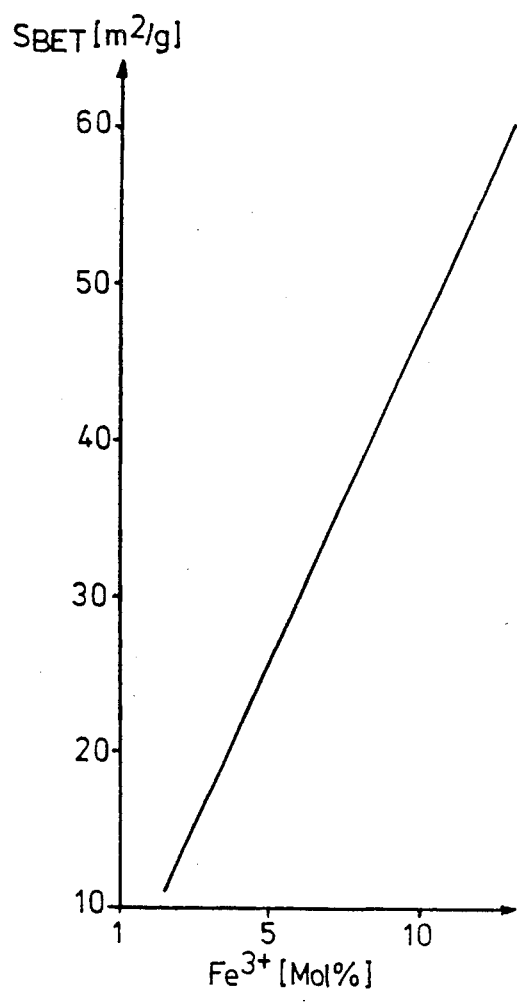
FIG. 3 illustrates the influence of the iron(III) content on the particle size of the magnetite, expressed by the specific surface area, at a constant equivalent ratio of precipitating agent/total iron content of 0.8.

An aqueous solution of 21.7 mol of $FeSO_4$ in 22 liters of solution is prepared in a 30 liter container equipped with gassing stirrer. The pH is 2.1. An iron(III) content of 0.45 mol % is determined by titration before oxidation is begun. The solution is heated to 70° C., and air is introduced by way of the gassing stirrer. The table below shows how the $Fe^{3+}$ content increases with the reaction time. For the sake of clarification, this relationship is also shown in graphic form in FIG. 1.

| Time/h | $Fe^{3+}$/mol % |
| --- | --- |
| Before starting | 0.45 |
| after heating in air (0.5 h) | 4.0 |
| 1 | 11.8 |
| 2 | 18.0 |
| 3 | 24.0 |
| 4 | 29.2 |
| 5 | 35.4 |
| 6 | 40.7 |

EXAMPLE 2

Adjustment of the iron(III) content 1.95 liters of iron(II) sulphate solution having a pH below 3 and containing 300 g of $FeSO_4$ are heated to 70° C. under gassing with air by means of the gassing ring in a 2.5 liter glass apparatus equipped with cross beam stirrer, gassing ring and reflux condenser and heated with a heater band adjusted by a contact thermometer. An iron(III) content of 8.3 mol %, based on the total iron content, is established in 1.75 hours.

EXAMPLE 3

Preparation of the precipitation magnetite and iron oxide red pigment

In a 2.5 liter glass apparatus equipped with cross beam stirrer, gassing ring and reflux condenser and heated with a heater band controlled by contact thermometer, 0.6 equivalents of magnesium oxide in the form of a slurry of ground magnesium oxide in water are added as precipitating agent to 1.95 liters of iron(II) sulphate solution in which 8.3 mol % of iron(III) ions have been produced. The reaction mixture is heated to 80° C. and gassed. The black iron oxide obtained after 4 hours is washed free from salt, dried and annealed in air at 800° C. for 1 hour. The properties of the ground iron oxide red pigment are entered in Table 1.

EXAMPLE 4

The procedure is the same as in Example 3 except that one equivalent of magnesium oxide is used as precipitating agent. The properties of the ground iron oxide red are entered in Table 1.

EXAMPLE 5

The procedure is the same as in Example 3 except that one equivalent of 9N NaOH is used as precipitating agent. The properties of the ground iron oxide red are entered in Table 1.

EXAMPLE 6

The proceudre is the same as in Example 3 except that 0.6 equivalents of magnesium oxide are used as precipitating agent and the iron(III) content is 5.6 mol %.

The properties of the ground iron oxide red are entered in Table 1.

EXAMPLE 7

EXAMPLE A

The procedure is the same as in Example 3 except that the reaction is carried out with an iron(II) salt solution obtained from steel pickling, in which the iron(III) content is less than 0.5 mol %, and precipitation is carried out with 1 equivalent of 9N NaOH. The properties of the ground iron oxide red pigment are entered in Table 1.

EXAMPLE B

The procedure is the same as in Example 3 except that the reaction is carried out with an iron(II) salt solution containing less than 0.5 mol % of iron(III), and precipitation is carried out with 1 equivalent of MgO. The properties of the ground iron oxide red pigment are entered in Table 1.

EXAMPLE C

The procedure is the same as in Example 3 except that the reaction is carried out with an iron(II) salt solution containing less than 0.5 mol % of iron(III), and precipitation is carried out with 0.6 equivalents of MgO. The properties of the ground iron oxide red pigment are entered in Table 1.

TABLE 1

| | Precipitating agent | Equivalents based on total iron | $Fe^{3+}$ content [mol %] | Al added [mol %] | P [mol %] | Specific surface area of magnetite [$S_{BET}$] | Annealing temperature/time [°C./min] | CIELAB colour data DIN 6174 C/2 deg 10% PVK alkydal F 48 | | |
|---|---|---|---|---|---|---|---|---|---|---|
| | | | | | | | | brightness [L*] | red shade [a*] | yellow shade [b*] |
| Example | | | | | | | | | | |
| 3 | MgO | 0.6 | 8.3 | | | 58 | 800° C./30' | 40.3 | 27.6 | 21.9 |
| 4 | MgO | 1 | 8.3 | | | 32 | 800° C./30' | 40.4 | 29.2 | 21.7 |
| 5 | NaOH | 1 | 8.3 | | | 31 | 800° C./30' | 39.4 | 27.9 | 20.1 |
| 6 | MgO | 0.6 | 5.6 | | | 35 | 800° C./30' | 40.3 | 27.0 | 22.5 |
| 7 | MgO | 1.1 | 8.3 | 1,4 | | 27 | 800° C./30' | 40.8 | 26.7 | 22.6 |
| 8 | MgO | 1.1 | 8.3 | 2.8 | | 29 | 800° C./30' | 41.6 | 27.1 | 23.1 |
| 9 | NaOH | 1.0 | 5.6 | | 1.6 | 33 | 800° C./30' | 41.1 | 27.2 | 21.7 |
| Comparison Example | | | | | | | | | | |
| A | NaOH | 1 | | | | 15 | 800° C./30' | 37.9 | 24.8 | 17.8 |
| B | MgO | 1 | | | | 15 | 800° C./30' | 36.7 | 24.0 | 14.2 |
| C | MgO | 0.6 | | | | 16 | 800° C./30' | 37.0 | 25.1 | 15.6 |

The procedure is the same as in Example 3 except that 1.1 equivalents of MgO are used as precipitating agent and 1.4 mol % of Al, based on the total iron content, are added in the form of $Al_2(SO_4)_3.18H_2O$ before precipitation. The properties of the ground iron oxide red pigment are entered in Table 1.

EXAMPLE 8

The procedure is the same as in Example 3, except that 1.1 equivalents of MgO are used as precipitating agent and 2.8 mol % of Al, based on the total iron content, are added in the form of $Al_2(SO_4)_3.18H_2O$ before precipitation. The properties of the ground iron oxide red pigment are entered in Table 1.

EXAMPLE 9

The procedure is the same as in Example 3 except that 1 equivalent of 9N NaOH is used as precipitating agent and 1.6 mol % of P, based on the total iron content, are added in the form of $Na_2HPO_4$ before precipitation. The properties of the ground iron oxide red pigment are entered in Table 1.

Comparison Examples:

What is claimed is:

1. In an improved process for the preparation of bright, color-pure iron oxide red pigments by precipitation of iron(II) salts in aqueous solution with an alkaline precipitating agent, oxidating at temperatures of from 20° C. to 100° C. and annealing of the resulting precipitation products under air to form iron oxide red pigments, the improvement comprises adding the alkaline precipitating agent to said aqueous solution which contains Iron(II) salts and Iron(III) salts and wherein the content of Iron(III) is 1 to 15 mol %, based on the total iron content of the iron salt solution.

2. A process according to claim 1 wherein oxidation is achieved by an oxidizing agent which is air.

3. A process according to claim 1 wherein the iron(III) content is produced by oxidation with air at a pH below 3.

4. A process according to claim 1 wherein the iron(II) salts are sulphates, chlorides or a mixtures of both.

5. A process according to claim 1 wherein the alkaline precipitating agent is NaOH, NH$_3$, Na$_2$CO$_3$, MgO, MgCO$_3$ or a mixture thereof.

6. A process according to claim 1 wherein precipitation is achieved with 0.5 to 1.3 equivalents of alkaline precipitating agent.

7. A process according to claim 6 wherein precipitation is achieved with 0.8 to 1.3 equivalents of alkaline precipitating agent.

8. A process according to claim 1 wherein prior to precipitation, a soluble aluminum salt is added to the solution in quantities of from 1 to 10 mol %, based on the total iron content.

9. A process according to claim 1 wherein prior to precipitation, a soluble phosphorous salt is added to the solution in quantities of from 1 to 5 mol %, based on the total iron content.

10. A process according to claim 1 wherein the precipitated iron oxide black is washed, dried, annealed at 700° to 1100° C. and then ground.

11. A process according to claim 10 wherein annealing is at 800° to 950° C.

* * * * *